US009971480B2

(12) United States Patent
Allen et al.

(10) Patent No.: US 9,971,480 B2
(45) Date of Patent: *May 15, 2018

(54) METHODS AND APPARATUS FOR PROVIDING GRAPHICAL VIEW OF DIGITAL CONTENT

(71) Applicant: FiftyThree, Inc., New York, NY (US)

(72) Inventors: Andrew S. Allen, Norwalk, CT (US); Julian Walker, Jersey City, NJ (US); Georg F. Petschnigg, New York, NY (US)

(73) Assignee: FIFTYTHREE, INC., New York, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/276,673

(22) Filed: Sep. 26, 2016

(65) Prior Publication Data

US 2017/0075529 A1    Mar. 16, 2017

Related U.S. Application Data

(63) Continuation of application No. 13/795,074, filed on Mar. 12, 2013, now Pat. No. 9,454,296.

(Continued)

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0485* (2013.01); *G06F 3/04842* (2013.01);
(Continued)

(58) Field of Classification Search
CPC .............................. G07F 17/32; G06F 15/0291
See application file for complete search history.

(56) References Cited

U.S. PATENT DOCUMENTS

| | | | |
|---|---|---|---|
| 4,524,993 A | 6/1985 | Walker-Taylor | |
| 5,127,879 A | 7/1992 | Schubert | |

(Continued)

FOREIGN PATENT DOCUMENTS

| | | |
|---|---|---|
| WO | W09512193 A1 | 5/1995 |
| WO | W02011094855 A1 | 8/2011 |

OTHER PUBLICATIONS

Final Office Action for U.S. Appl. No. 13/795,074, filed Mar. 12, 2013, and mailed from the USPTO dated Dec. 31, 2015, 10 pgs.
(Continued)

*Primary Examiner* — William Bashore
*Assistant Examiner* — Rayeez Chowdhury
(74) *Attorney, Agent, or Firm* — Stoel Rives, LLP

(57) ABSTRACT

A non-transitory processor-readable medium storing code representing instructions to be executed by a processor to define a set of indicators encoding a set of content segments from the set of content segments. The processor further defines, for each content segment, a first link between that content segment and an indicator from the set of indicators, such that the first link associates a center component of the content segment to that indicator. The processor also defines, for each content segment, a second link between that content segment and an adjacent content segment within the sequence of content segments, such that the second link associates an edge component of that content segment to an edge component of the adjacent content segment. The processor also defines a presentation of the set of content segments based on the first link and the second link, for each content segment.

11 Claims, 9 Drawing Sheets

Related U.S. Application Data

(60) Provisional application No. 61/617,342, filed on Mar. 29, 2012.

(51) Int. Cl.
    *G06F 3/0484*      (2013.01)
    *G06F 3/0485*      (2013.01)
    *G06F 15/02*      (2006.01)
    *G09G 5/00*      (2006.01)

(52) U.S. Cl.
    CPC ...... *G06F 3/04845* (2013.01); *G06F 15/0291* (2013.01); *G09G 5/00* (2013.01); *G09G 2340/14* (2013.01); *G09G 2380/14* (2013.01)

(56) References Cited

U.S. PATENT DOCUMENTS

| | | |
|---|---|---|
| 5,167,508 A | 12/1992 | Mc Taggart |
| 6,486,895 B1 | 11/2002 | Robertson et al. |
| 7,725,919 B1 | 5/2010 | Thiagarajan et al. |
| 9,454,296 B2 | 9/2016 | Allen et al. |
| 2001/0044780 A1 | 11/2001 | Miyazaki et al. |
| 2006/0225121 A1 | 10/2006 | Tischer et al. |
| 2007/0168883 A1 | 7/2007 | Sugimoto |
| 2008/0092049 A1 | 4/2008 | Gould et al. |
| 2008/0101456 A1 | 5/2008 | Ridge et al. |
| 2010/0070845 A1 | 3/2010 | Facemire et al. |
| 2010/0241961 A1 | 9/2010 | Peterson et al. |
| 2010/0278453 A1 | 11/2010 | King |
| 2011/0126236 A1 | 5/2011 | Arrasvuori et al. |
| 2012/0079372 A1 | 3/2012 | Kandekar et al. |
| 2012/0139815 A1 | 6/2012 | Aono et al. |
| 2012/0176322 A1 | 7/2012 | Karmi et al. |
| 2012/0240036 A1 | 9/2012 | Howard et al. |

OTHER PUBLICATIONS

International Search Report and Written Opinion for International Application No. PCT/US13/34101 mailed from the International Searching Authority dated Aug. 26, 2013, 9 pgs.

Non-Final Office Action for U.S. Appl. No. 13/795,074, filed Mar. 12, 2013, and mailed from the USPTO dated Mar. 27, 2015, 9 pgs.

Notice of Allowance and Fee(s) Due for U.S. Appl. No. 13/795,074, filed Mar. 12, 2013, and mailed from the USPTO dated Jul. 29, 2016, 10 pgs.

International Preliminary Report on Patentability for International Application No. PCT/US2013/034101 mailed from the International Bureau dated Jun. 4, 2015, 6 pgs.

METHODS AND APPARATUS FOR PROVIDING GRAPHICAL VIEW OF DIGITAL CONTENT

CROSS-REFERENCE TO RELATED APPLICATIONS

This application is a continuation of U.S. patent application Ser. No. 13/795,074, entitled "Methods and Apparatus for Providing Graphical View of Digital Content," which issued as U.S. Pat. No. 9,454,296 on Sep. 27, 2016, and which claims priority to U.S. Provisional Patent Application No. 61/617,342, entitled "Graphical View for Images," filed on Mar. 29, 2012, the entire disclosure of each of which is incorporated herein by reference.

BACKGROUND

Some embodiments described herein relate generally to providing graphical interfaces, and more particularly to providing graphical views for digital content such as, for example, documents, images, and video frames.

Currently known graphical interfaces typically display information in grids or windows. These arrangements suffer from inefficiencies such as how to best display digital information. Grid arrangements display every piece of information without overlap, however, often requiring adjustments to scale or to scrolling. Window systems can maintain content at the same scale, but can cause overlap of the content, which often require the user to manage the windows.

Therefore, a need exists for an approach to overcome the shortcomings of the existing methods by providing graphical views of digital information to allow the user to receive the information quickly and efficiently, particularly in mobile interfaces.

SUMMARY

In some embodiments, a non-transitory processor-readable medium stores code representing instructions to be executed by a processor, the code comprising code to cause the processor to receive data associated with a content having a set of content segments. The processor is also caused to define a set of indicators encoding the set of content segments and associated with a sequence of content segments from the set of content segments. The processor is further caused to, for each content segment from the set of content segments, define a first link between that content segment and an indicator from the set of indicators, such that the first link associates a center component of the content segment to that indicator. The processor is also caused to, for each content segment from the set of content segments, define a second link between that content segment and an adjacent content segment within the sequence of content segments from the set of content segments, such that the second link associates an edge component of that content segment to an edge component of the adjacent content segment. The processor is also caused to define a presentation of the set of content segments based, at least in part, on the first link and the second link, for each content segment from the set of content segments. The processor is further caused to send a signal to associate the presentation to the content.

DETAILED DESCRIPTION

Figure 1:
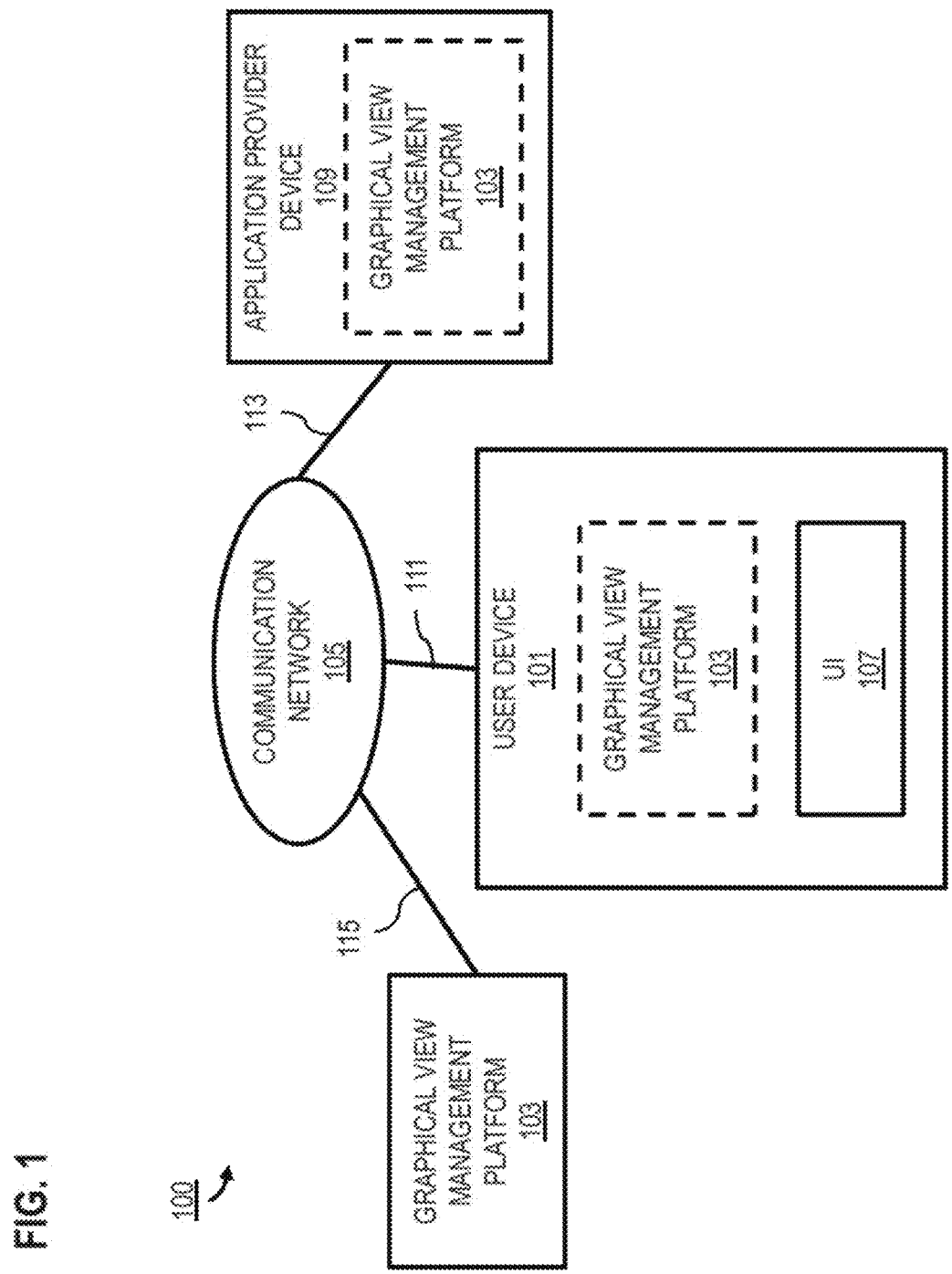
FIG. 1 is a schematic block diagram of a computer system in which graphical view functions can be performed, according to an embodiment.

Known digital content management systems store and retrieve digital content such as, for example, content associated with documents and images on the basis of attributes of physical documents. For example, pages of digital photo albums or digital books and magazines have the graphical capability of being turned by a user (for example by clicking on the corner of the current page) to access a next or a previous page. The design of these known digital content presentations, however, is typically similar to physical documents where consecutive pages are printed on both sides of a sheet of paper. In such designs, two pages of content share one graphical presentation. The known designs, however, make content management operations such as content retrieval and modification difficult. For example, deletion of a page can cause deletion of a consecutive page that shares a graphical representation with the deleted page.

Methods and apparatus are described herein to provide graphical view of digital content within a graphical user interface of a user device. In some embodiments, a non-transitory processor-readable medium stores code representing instructions to be executed by a processor, the code comprising code to cause the processor to receive data associated with a content having a set of content segments. The processor is also caused to define a set of indicators encoding the set of content segments and associated with a sequence of content segments from the set of content segments. The processor is further caused to define, for each content segment from the set of content segments, a first link between that content segment and an indicator from the set of indicators, such that the first link associates a center component of the content segment to that indicator. The processor is also caused to, for each content segment from the set of content segments, define a second link between that content segment and an adjacent content segment within the sequence of content segments from the set of content segments, such that the second link associates an edge component of that content segment to an edge component of the adjacent content segment. The processor is also caused to define a presentation of the set of content segments based, at least in part, on the first link and the second link, for each content segment from the set of content segments. The processor is further caused to send a signal to associate the presentation to the content.

In some embodiments, a non-transitory processor-readable medium stores code representing instructions to be executed by a processor, the code comprising code to cause the processor to receive an input signal associated with a content having a set of content segments being encoded based, at least in part, on a set of indicators, the input signal including (1) an action indicator associated with an action, and (2) a presentation indicator associated with a presentation of the content. The processor is also caused to send a signal to a data store including data associated with the presentation, such that the action is performed on the presentation to select a content segment from the set of content segments based, at least in part, on a set of links between content segments from the set of content segments. The processor is further caused to update the content segment and the set of links based, at least in part, on the action. The processor is further caused to send a signal to display the presentation of the content.

In some embodiments, a non-transitory processor-readable medium stores code representing instructions to be executed by a processor, the code comprising code to cause the processor to receive an input signal associated with a presentation of a content having a set of content segments, the presentation including the set of content segments encoded based, at least in part, on a set of indicators, the input signal including an action indicator associated with an action on the presentation. The processor is also caused to send a signal to a data store including data associated with the content, such that the action is performed on the data to produce modified data. The processor is further caused to update the presentation based, at least in part, on the modified data to produce an updated presentation and an updated set of indicators. The processor is also caused to send a signal including the updated presentation of the content and the updated set of indicators.

In some embodiments, digital information is arranged on representations of pages that are folded similar to an accordion. A user can quickly move through these representations of pages and expand them to full-size views for rapid inspection. Furthermore, a Graphical User Interface (GUI) is provided for displaying a sequence of content pieces, such as images, text documents, video frames, etc. of any length on a visual display.

As used herein, "user" can be a person, a module, a device, or an application. In some of the embodiments discussed, a user is referred to as a person using the user device via one or more user interfaces. Additionally/alternatively, a user can be a device, a module of a device, or an application such as, for example, art applications, computer games, simulation applications, etc., that can use the graphical views provided and managed by the described methods and apparatus.

As used herein, the singular forms "a," "an" and "the" include plural referents unless the context clearly dictates otherwise. Thus, for example, the term "a "digital content" is intended to mean a single digital content or a combination of digital contents (e.g., pages of a book, a magazine, a photo album, etc.).

FIG. 1 is a schematic block diagram of a computer system in which graphical view functions can be embodied, according to an embodiment. The computer network system 100 includes at least one user device 101, equipped with at least a user interface (UI) 107. The computer network system 100 also includes a graphical view management platform 103; and at least one application provider device 109, which can be operatively coupled to one or more user devices 101 or other application providers via a communication network 105. Note that the graphical view management platform 103 or some of its components can be embedded within the user device 101, or within the application provider device 109, or be external to the user device 101 and application provider device 109, and operatively coupled to one or more user devices 101 or one or more application providers 109 via a communication network 105. Any of the devices or platforms of the computer network system 100 can be equipped with local memory/storage spaces (not shown in FIG. 1). Furthermore, the devices and platforms of the system 100 may have access to centralized or distributed memory/storage spaces (not shown in FIG. 1) through the communication network 105. Additionally, a user device 101, a graphical view management platform 103, and an application provider device 109 each can include one or more processors, performing processes associated with the services provided to the user devices 101 (each not shown in FIG. 1). Thus, FIG. 1 is merely an example illustrating the types of devices and platforms that can be included within a computer network system 100.

Communication network 105 can be any communication network, such as the Internet, configurable to allow the user device 101, the graphical view management platform 103, and the application provider device 109 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the user device 101 can be operatively coupled to a cellular network; the application provider device 109 and/or the graphical view management platform 103 can be operatively coupled to a fiber-optic network. The cellular network and fiber-optic network can each be operatively coupled to one another via one or more network bridges, routers, switches, and/or gateways such that the cellular network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the user device 101 is operatively coupled to communication network 105 via network connection(s) 111; application provider device 109 is operatively coupled to communication network 105 via network connection(s) 113; and the graphical view management platform 103 is operatively coupled to communication network 105 via network connection(s) 115. Network connections 111, 113, and 115 can be any appropriate network connection for operatively coupling user device 101, application provider device 109, and the graphical view management platform 103.

A network connection can be a wireless network connection such as, for example, a wireless fidelity ("Wi-Fi") or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

As mentioned above, in some instances, a computer network system 100 can include more than one user device 101, more than one graphical view management platform 103, and more than one application provider device 109. A user device 101, a graphical view management platform 103, and/or an application provider device 109, can be operatively coupled to the communication network 105 by heterogeneous network connections. For example, a first user device 101 can be operatively coupled to the communication network 105 by a WWAN network connection, another user device 101 can be operatively coupled to the communication network 105 by a DSL network connection, and a graphical view management platform 103 can be operatively coupled to the communication network 105 by a fiber-optic network connection. The application provider device 109 can be, for example, a web server configured to provide various applications to electronic devices, such as user device 101.

The user device 101 can be any of a variety of electronic devices that can be operatively coupled to communication network 105. A user device 101 can be a personal computer, a tablet computer, a personal digital assistant (PDA), a cellular telephone, a TV, a portable/mobile internet device and/or some other electronic communication device. The user device 101 can include a web browser configured to access a webpage or website hosted on or accessible via the application provider device 109 over communication network 105. The user device 101 can be configured to support, for example, HTML using JavaScript. For example, the user device 101 can include a web browser, such as, Firefox, Safari, Dolphin, Opera and Chrome. An Internet page or website can be accessed by a user of a web browser at a user device 101 by providing the web browser with a reference such as a uniform resource locator (URL), for example, of a webpage. For example, a user of a user device 101 can access an application provider device 109 via a URL designated for the application provider device 109. In some instances, user device 101 can include specialized software for accessing a web server other than a browser, such as, for example, a specialized network-enabled application or program. In some instances, portions of a website accessible via a web server can be located in a local or remote memory space/data store accessible to the web server. A data store can be at least one of a database, a data warehouse, or a file. A user device 101 can also include a display, monitor or user interface (UI) 107, a keyboard, various ports (e.g., a USB port), and other user interface features, such as, for example, digital pens, mice, touch screen controls, audio components, and/or video components (each not shown). A user device 101 can be operatively coupled to communication network 105 via the UI 107 and network connection 111.

Figure 2:
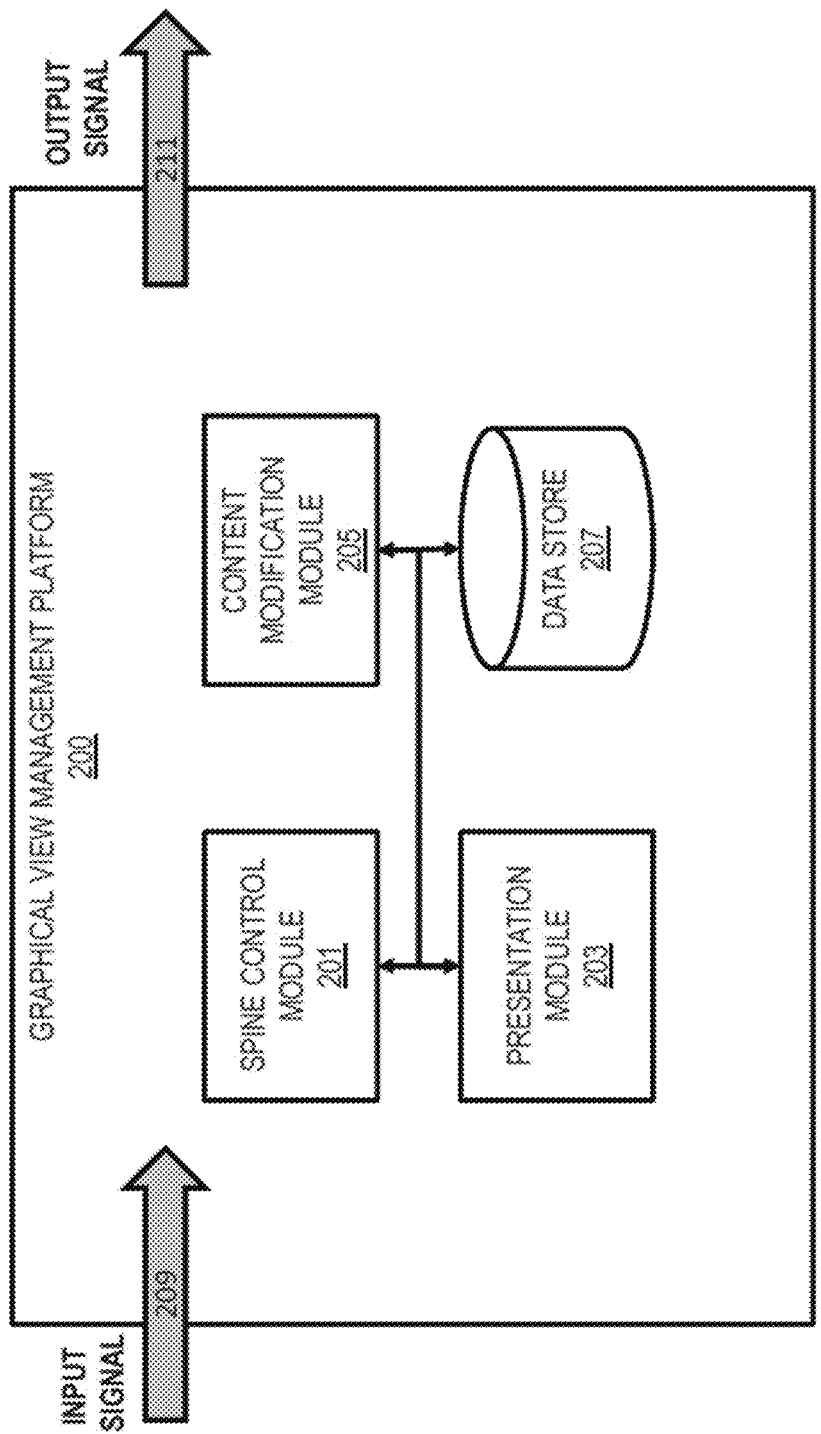
FIG. 2 is a schematic illustration of a graphical view management platform, according to an embodiment.

FIG. 2 is a schematic illustration of a graphical view management platform, according to an embodiment. Graphical view management platform 200 can be similar to the graphical view management platform 103 of FIG. 1. As shown in FIG. 2, a graphical view management platform 200 can include a spine control module 201, a presentation module 203, a content modification module 205, and a data store 207. Furthermore, the graphical view management platform 200 can communicate with other components of a computer network system (e.g., computer network system 100 of FIG. 1) via input signals 209 and output signals 211.

In various instances, the graphical view management platform 200 and its components may be located anywhere within a communication network system 100 such as that shown in FIG. 1 including, but not limited to, within the user device 101, within the application provider device 109, or in separate locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The graphical view management platform 200 can provide graphical view management on a user device 101 via a UI 107. In some instances, the graphical view management platform 200 provides a graphical view of a content to the user device 101, where the content can be a set of images (e.g., a photo album), pages of a document (e.g., a book, a magazine, etc.), a set of video frames, or any other digital content.

The spine control module 201 can define a sequence within a content and among one or more segments of the content (e.g., sequence of pages of a book or sequence of photos in a photo album). The sequence can provide an order between the content segments.

The presentation module 203 can present the content on the UI 107 in a layout at least based on the sequence defined by the spine control module 201. The layout can be reminiscent of an accordion or an open book. The presentation module 203 can provide a single segment of the content (e.g., a single image, a single page of the book, or a single video frame) that is displayed centrally on the UI 107 as a current content segment. Furthermore, the presentation module 203 can present some of other content segments adjacent to the current segment in the sequence (e.g., previous and/or next pages) as being cascaded behind the current content segment and to the side to provide visual context, indicating the current position of the current segment within the sequence. The presentation module 203 can provide a fixed number of content segments, at any given time, to be displayed on UI 107. In addition, the presentation module 203 can provide updated presentation of content segments based on an input received from a user of user device 101 via the input signal 209 or from the content modification module 205.

The graphical view management platform 200 can enable a user of the user device 101 to navigate to adjacent content segments in a seamless and fluid manner through touch gestures (when UI 107 has a touch screen capabilities) or via other type of input such as using a keypad of the user device 101 (not shown in FIG. 1).

In some instances, the content can be provided by an application provider device 109, for example, based on a request from a user of the user device 101. The content can be stored in data store 207, in a local storage of the user device 101 (not shown in FIG. 1), or in a separate location accessible to the user device 101 and the graphical view management platform 200 via the communication network 105.

In some instances, the content modification module 205 can modify the content, content segments, content segment sequence, etc., at least based on one or more requests by a user of user device 101. The content modification module 205 can load into a memory of the user device 101 representations (e.g., data, signals, values) of the content segments that are displayed within and visible on the UI 107. The content modification module 205 can also unload from the memory the representations of the content segments no longer displayed within or visible on the UI 107. The loading and unloading processes can be conducted by the content modification module 205 either synchronously or asynchronously. The graphical view management platform 200 can enable fluid presentation (display) of the content segments for transitioning to show a single content segment from a sequence of content segments as a current content segment. The graphical view management platform 200 can also provide a presentation (display) of the content similar to a closed book or journal where all the visible content segments are collapsed.

The layout of the content segments can be defined by the spine control module 201 using a set of indicators. The set of indicators can provide a single curved path similar to a book spine. The spine control module 201 can use the set of indicators to provide a basic shape for how the content segments from a sequence of content segments are arranged relative to each other. The spine control module 201 can also provide visual parameters such as difference in depth and translation between successive content segments in the sequence. The spine control module 201 can associate a shape and size to the set of indicators and animate the set of indicators as part of a transition between states of the presentation such as, for example, for transitioning from a state of displaying multiple content segments to displaying a single content segment on the UI 107.

Figure 4:
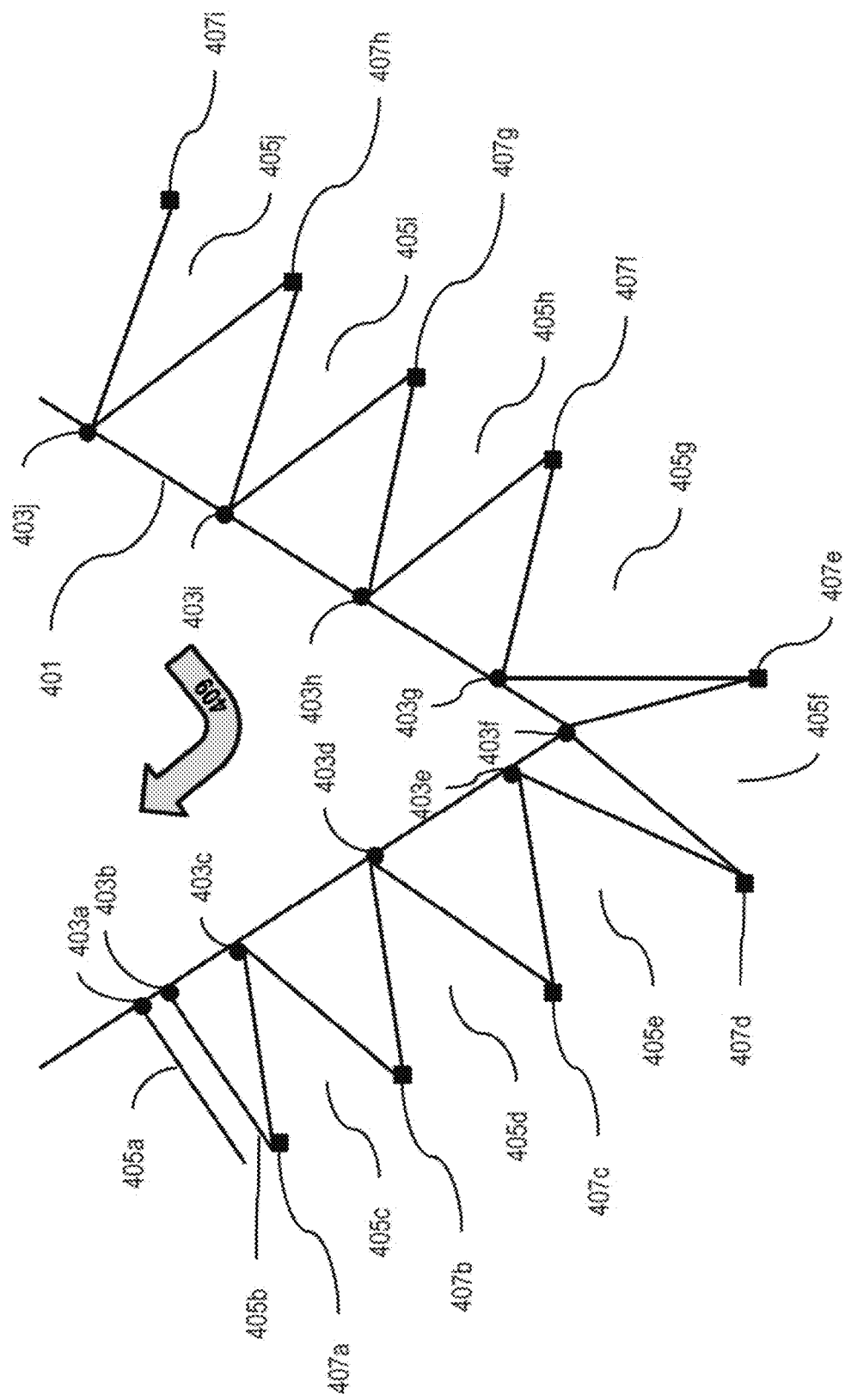
Figure 5:
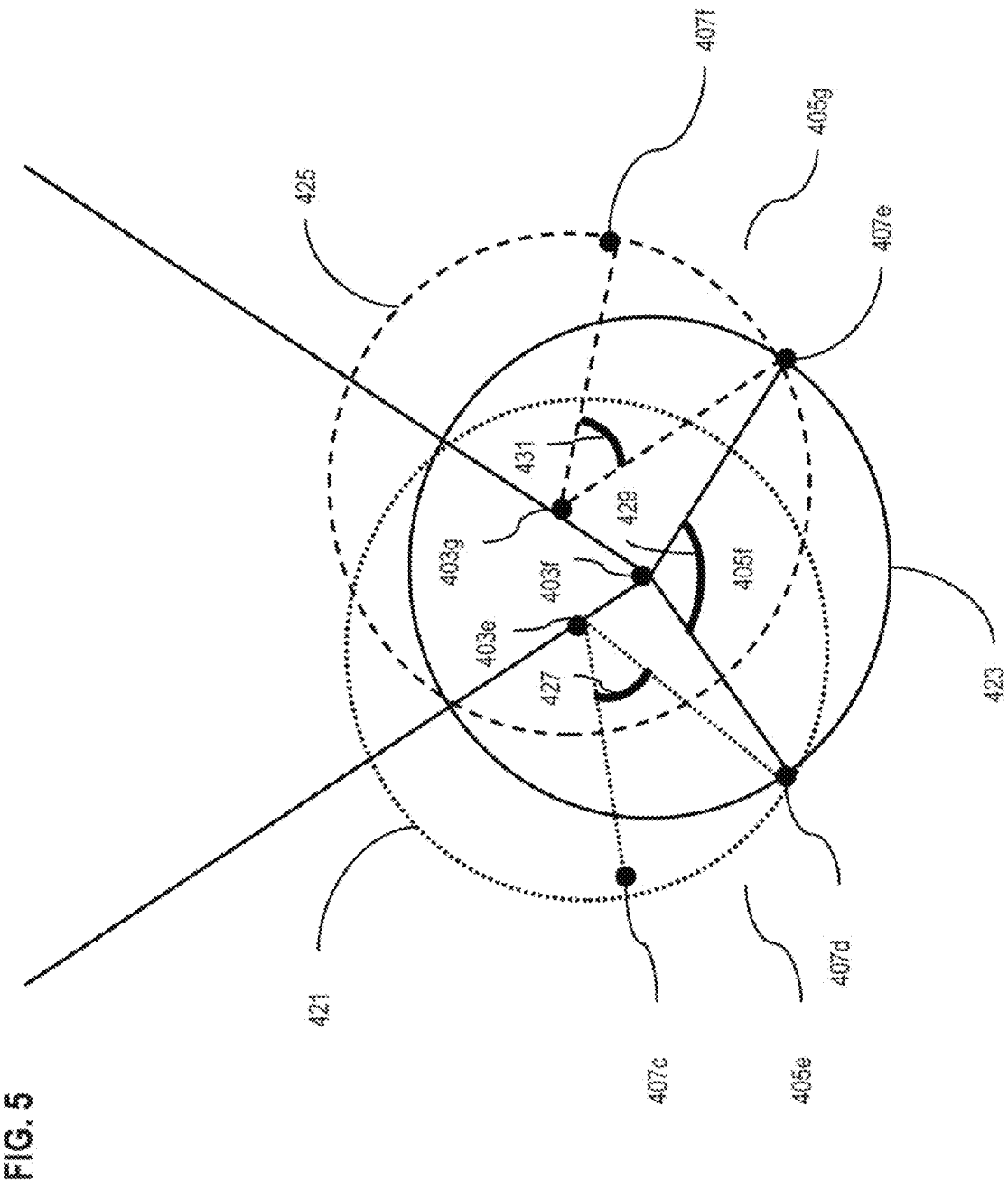
Figure 6:
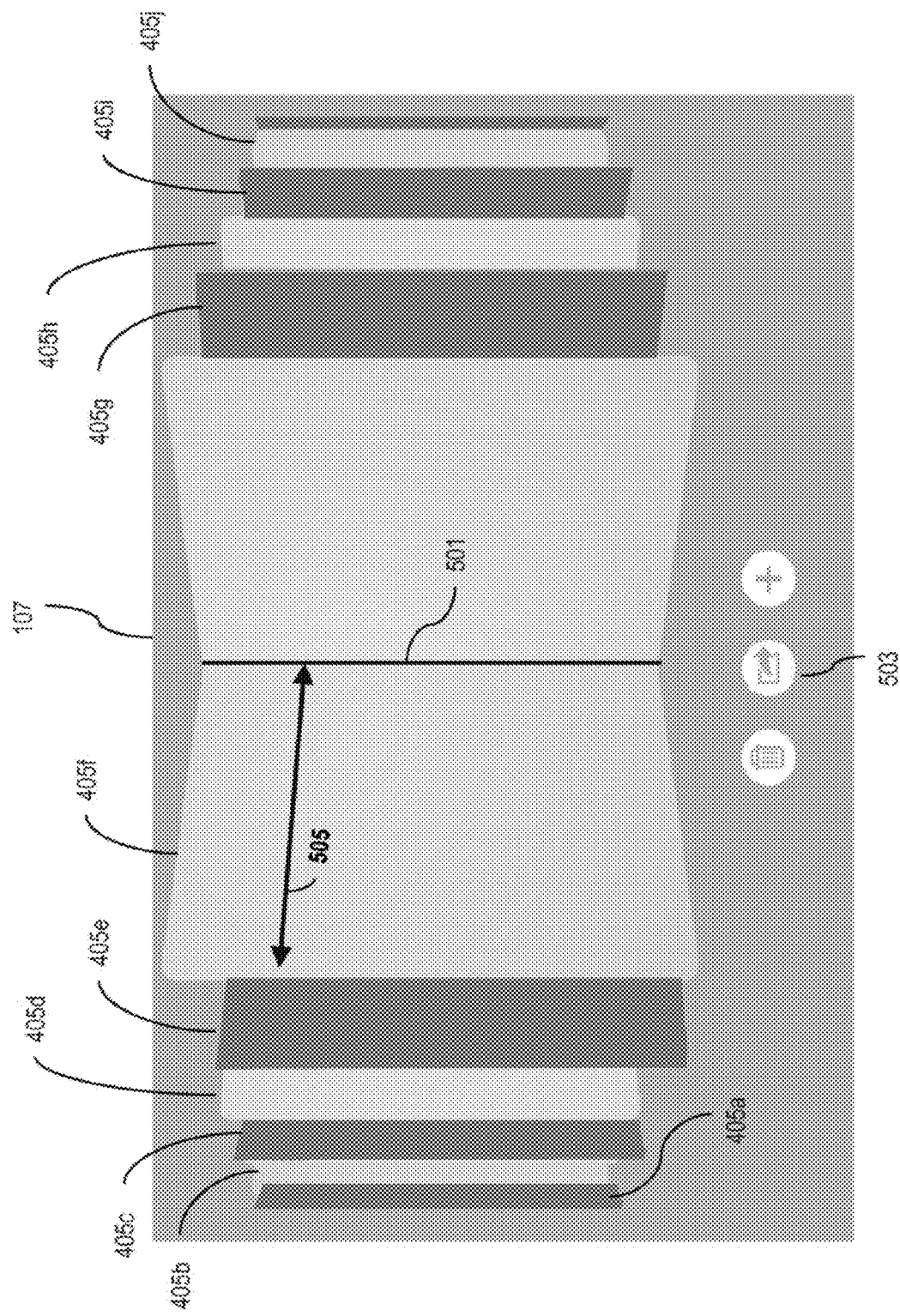
FIG. 6 is an illustration of a sample graphical view based on a set of indicators, according to an embodiment.

FIGS. 3-6 are illustrations of sample arrangements of content segments based on a set of indicators, according to an embodiment, and FIG. 6 is an illustration of a sample graphical view based on a set of indicators, according to an embodiment. FIG. 6 is described with respect to FIGS. 3-6.

Figure 3:
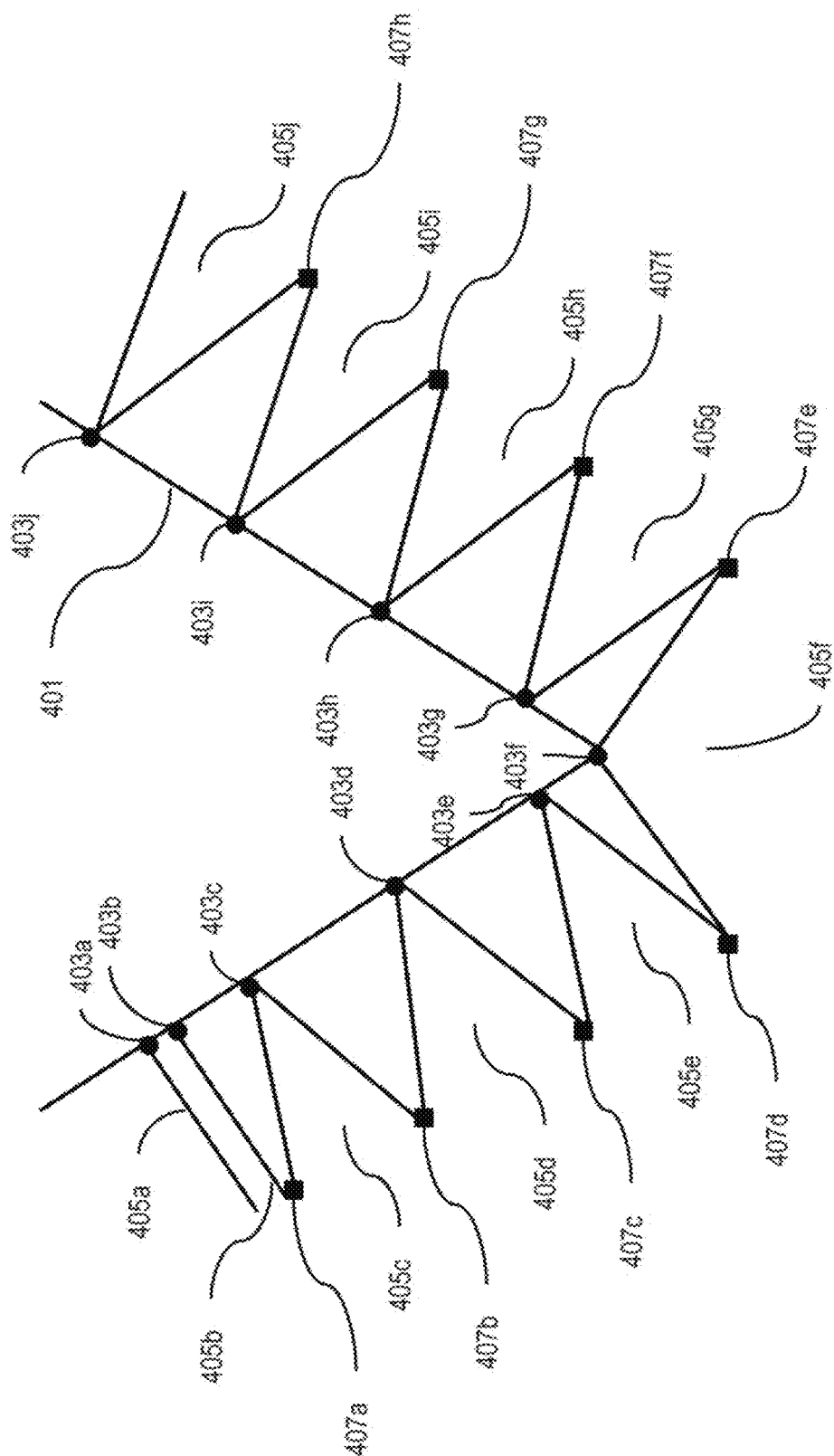
FIGS. 3-5 are illustrations of sample arrangements of content segments based on a set of indicators, according to an embodiment.

As shown in FIG. 3, the spine control module 201 lays out the content segments 405a-405j on a spine 401 such that they appear folded through their centers along an axis (shown as 501 in FIG. 6) with the centers affixed to the spine 401 by the set of indicators 403a-403j. The spine control module 201 also connects each content segment 405a-405j to at least one adjacent content segment 405a-405j at the edges of the content segments (shown as connection points 407a-407i). For example, the connection point 407d connects the current content segment 405f to its adjacent content segment 405e. Similarly the connection point 407e connects the current content segment 405f to its other adjacent content segment 405g.

The spine control module 201 can adjust the spacing and translation of the centers 403a-403j of content segments 405a-405j along the spine 401 such that different visual states and animations can be achieved when displaying the content segments 405a-405j on the UI 107 of a user device 101 (as seen in FIG. 6).

In some instances, the spine control module 201 can use one or more linear functions to cause the presentation module 203 to control spacing of indicators 403a-403j along the spine 401 such that the spacing is uniform. In other instances, however, the spine control module 201 can use non-linear functions to make the presentation module 203 to compress or expand the spacing of content segments in various ways. For example, when presenting the closing state of a book, the presentation module 203 can isolate the content segments 405a-405j to a subset of the indicators 403a-403j on the spine 401 and cluster the indicators into overlapping groups.

In FIG. 5, for example, the content segment 405f is defined as the current content segment. The current content segment 405f is displayed at the center of the spine 401 while the current content segment 405f is folded at the center and is affixed to the spine 401 by the indicator 403f. The content segments 405e and 405g are adjacent to the central content segment 405f. The content segment 405e is folded at its center and is connected to the spine 401 by the indicator 403e. The content segment 405e is also connected to its adjacent content segments 405d and 405f at edges 407c and 407d respectively. Similarly the content segment 405g is folded at its center and is connected to the spine 401 by the indicator 403g. The content segment 405g is also connected to its adjacent content segments 405f and 405h at edges 407e and 407f respectively.

In known techniques for displaying a book or journal, mapping a content segment (e.g., a page) to a page presentation on a user interface involves either allocating the content segment to a single page or splitting the content segment down the middle and having the content segment share the reverse side of its two pages with the two adjacent content segments in the sequence. In contrast, the spine control module 201 can modify connections between the centers of the content segments 405a-405j as part of a transition to a new current content segment as the centrally located content segment. For example, in FIG. 4, the content segment 405g, the content segment adjacent to the content segment 405f, is the content segment to replace the content segment 405f as the current content segment. As shown in FIG. 4, the spine control module 201 moves the content segments 403a-403j along the spine 401, in the direction shown by arrow 409, such that the content segment 403g moves to the center of spine 401 and the content segments 403a to 403f and 403h to 403j redistribute accordingly. The spine control module 201 can also redistribute edges 407a-407i such that the content segment 405g is presented as an open page.

The visual effect of this modification can be seen in FIG. 6. This visual presentation of the content segments can be similar to the shape of an accordion. The presentation of content, as described, enables the graphical view management platform 200 to provide non-ambiguous selection, addition, or removal of content segments without affecting other segments.

In known techniques for displaying a book, for example, where two pages share both sides of one presented page, removal of one of the pages can involve a rearrangement of the whole content to define correct links between the remaining reverse side page and other adjacent pages. In contrast, the content modification module 205 can remove a content segment without affecting other content segments. Subsequently, the content modification module 205 can modify links between the remaining segments. For example, removal of a content segment 405d in FIGS. 3 and 4, by the content modification module 205 does not affect other content segments such as 405c or 405e. The content modification module 205 can connect content segment 405c to the content segment 405e, for example, by defining the content segment 405e as the next content segment to 405c. In such instances, single content segments are not visually split across pages and any surface selected in the presentation corresponds to exactly one content segment. In known techniques, however, when selecting a page it is not always clear whether the selection encompasses both sides of the page or whether the selection excludes the adjacent page that shares the backside of the selected page. For example, in known techniques, if a user of a user device 101 selects a page for removal, it is not clear whether both the front and back of that page are subject to the removal.

The presentation module 203 can present each content segment as folded in the center and affixed to the spine 401 by the indicators 403a-403j. This presentation enables a graphical view management platform 200 to provide transitioning to viewing a single content segment from the sequence of content segments to a user of the user device 101 in a fluid and intuitive manner. Because the content segments 405a-405j are folded at the center and affixed to the spine 401 at indicator points 403a-403j rather than representing one half of a page in a known book or journal, it is natural to animate the parameters of the spine 401 such that the central content segment 405*f* becomes less folded (more flat relative to the display), and pairs of adjacent content segments to the current content segment 405*f* with equal distance such as 405*e* and 405*g*, 406*d* and 405*h*, 405*c* and 405*i*, etc., become progressively hidden behind the current content segment 405*f*, as shown in FIG. 6. Eventually the current content segment 405*f* can be detached from the spine 401 and presented completely flat on a UI 107. Such presentation can be executed by the presentation module 203 fluidly using either automated animations, for example in response to a user input via button 503 of FIG. 6, in response to an automated animation, or in response to gestural input from a user of user device 101 received via input signal 209. A gestural input by a user of the user device 101 can be, for example, pinch, spread, tap, pan, drag, drop, etc.

In some instances, the presentation of content by the presentation module 203 is invertible, allowing a user of user device 101 to return to presenting multiple content segments from presenting a single content segment in an analogous manner, for example by undoing the actions applied on the content segments.

In some instances, the presentation module 203 can define a presentation of the content to transition from presenting multiple content segments to presenting an appearance of a closed book or journal. In such instances, the spine 401 can gradually flatten and the spacing between the indicators 403*a*-403*j* along the spine 401 can be gradually made smaller until the content segments 405*a*-405*j* nearly collapse on each other. From this state, additional animations that suit the use case can be performed by the presentation module 203 that treat the layout as a single, planar content segment or a cover.

In some instance, the spine control module 201 can parameterize a curve associated with spine 401 and select functions that define content segments' center spacing on the spine 401 to define states of the content presentation in terms of these parameters. For example, the spine control module 201 can define a set of states of the content such as "multiple pages", "closed", "single page", etc. The spine control module 201 can also define new data associated with the set of states such that the new data interpolates the presentation of the content, for example, based on automated animation or gestural input from a user of the content on a user device 101. For example, the transition between the states "multiple pages", "closed", "single page", etc. can be smoothly animated using a combination of pinch, spread, tap, pan, drag, drop, etc. gestures by a user of user device 101.

In some instances, a presentation of content by the presentation module 203 can be preempted by another presentation without causing a discontinuity in the animation or producing an inconsistent state of the content. For example, the graphical view management platform 200 can provide presentations capable of providing navigation of a sequence of images in a variety of modes that respond to user input substantially in real-time.

FIG. 5 is an illustration of implementation of a graphical view, according to one embodiment. In some instances, the presentation module 203 calculates the angle of fold for each content segment 405*a*-405*j* and the orientation of the content segment. For example, the presentation module 203 can represent (or calculate) a circle 421, 423, or 425, respectively, for each content segment 405*e*, 405*f*, and 405*g* of FIG. 5, such that the circles are centered at indicators 403*e*, 403*f*, and 403*g* on the spine 401 associated with the centers of content segments 405*e*, 405*f*, and 405*g*. The radius of each circle 421, 423, and 425 can be equal to half of the width of the associated content segment (shown as 505 in FIG. 6). In such instances, the connection points 407*c*, 407*d*, 407*e*, and 407*f* in FIG. 5, where a content segment meets its adjacent content segments are defined as intersection points of the circle associated with that content segment with the circle associated with the adjacent content segment. For example, the connection point 407*d* is an intersection of circle 421 associated with the content segment 405*e* and the circle 423 associated with the content segment 405*f*. Similarly, the connection point 407*e* is an intersection of circle 423 associated with the content segment 405*f* and the circle 425 associated with the content segment 405*g*.

In some instances, when the content segments have unchangeable sizes and do not fold (except at the center), after fixing the centers of the content segments to the indicators 403*e*, 403*f*, and 403*g* on the spine 401, the presentation module 203 can join the content segments to each other from one end (405*a*) to the other end (405*j*). Subsequently, the connection points 407*c*, 407*d*, and 407*e*, where the content segments meet, can be calculated by the presentation module 203, by representing (or calculating) the circles 421, 423, and 425, as previously discussed. After the definition of connection points 407*c*, 407*d*, and 407*e*, the content segment folding angles 427, 429, and 431 and their orientations can be defined, by the presentation module 203, based on the positions of connection points 407*c*, 407*d*, and 407*e*.

In some instances, the graphical view management platform 200 enables a user of a user device 101 to view graphical content using variety of curves as the spine 401. As the spine curve 401 changes, the arrangement of content segments 405*a*-405*j* can change continuously. For example, the spine control module 201 can warp the spine curve 401 and extend the path allocated to content segments to achieve various states for the view of the content such as, for example, a closed book, an open book, a single page view, etc. The presentation module 203 can provide, on a UI 107 of a user device 101, continuous transition between the states of a content and other states in between by interpolating the parameters such as angles 427, 429, and 431; connection points 407*c*, 407*d*, and 407*e*; indicators 403*e*, 403*f*, and 403*g*, etc.

Figure 7:
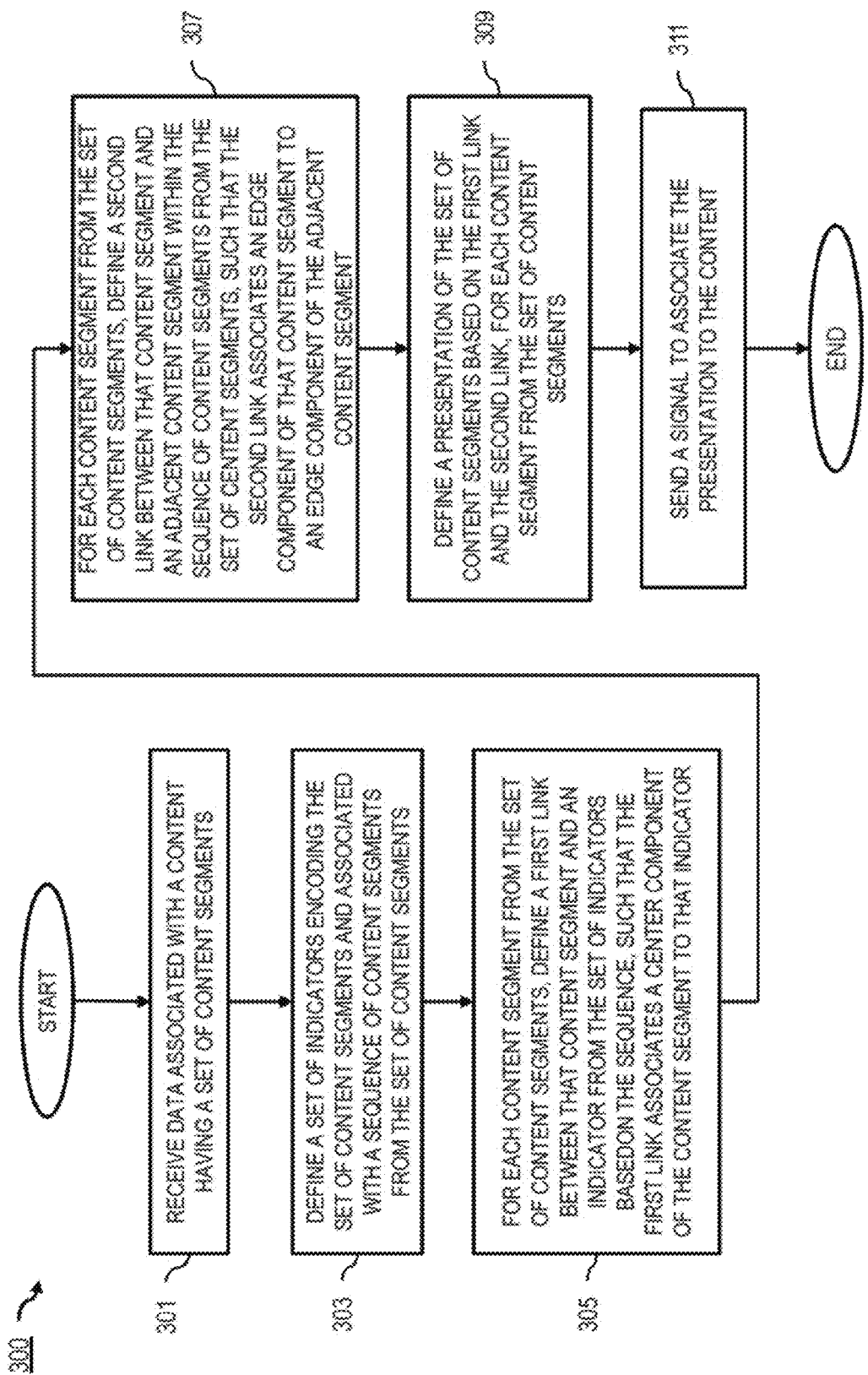
FIGS. 7-9 are flowcharts of processes for providing graphical view of digital content, according to an embodiment.
Figure 8:
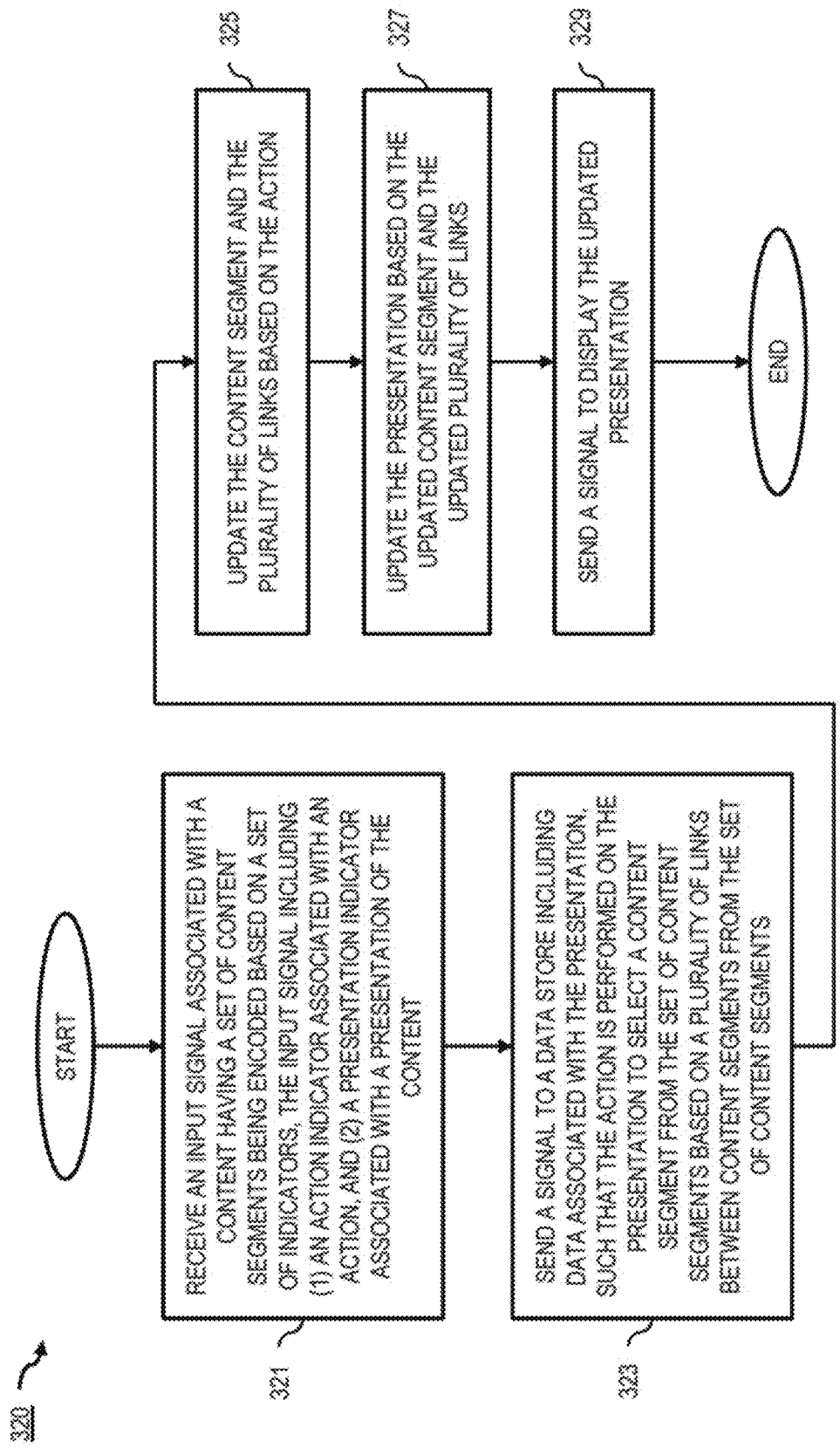
Figure 9:
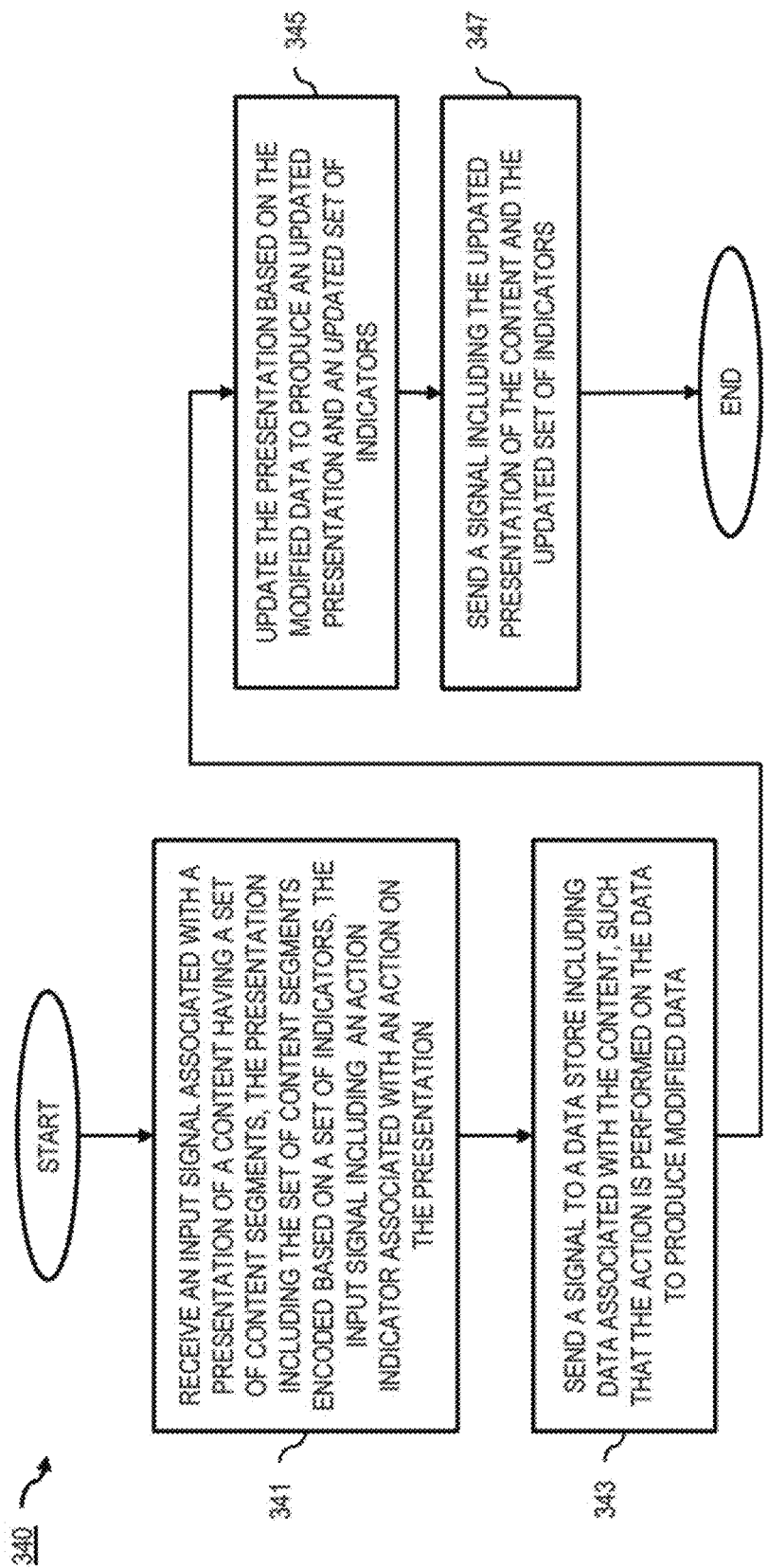

FIGS. 7-9 are flowcharts of processes for providing graphical view of digital content, according to an embodiment. FIG. 7 shows a flowchart 300 for defining a graphical view, according to an embodiment. At 301, the graphical view management platform 200 receives data associated with a content having a set of content segments via an input signal 209. The graphical view management platform 200 may receive data from an application provider device 109, from a user device 101, or from other devices having access to the graphical view management platform 200 via the communication network 105. The data may include order of content segments, presentation format, etc. Furthermore, the graphical view management platform 200 can store the received data in data store 207.

At 303, the spine control module 201 defines a set of indicators encoding the set of content segments. The set of indicators can define a sequence of content segments from the set of content segments. At 305, the spine control module 201 defines a link between a content segment and an indicator from the set of indicators, for each content segment from the set of content segments. The spine control module 201 can define the links between content segments and indicators based on the sequence of content segments. The spine control module 201 can identify a center component for each content segment (e.g., center of a page of a book) and define the link between each content segments and one indicator such that the link associates the center component of the content segment to that indicator.

At 307, the spine control module 201 defines, for each content segment from the set of content segments, a link between the content segment and an adjacent content segment (e.g., a next page or a previous page of a page of a book) within the sequence of content segments from the set of content segments. The spine control module 201 can identify at least one edge component for each content segment (e.g., edge of a page of a book) and define the link between the content segment and an adjacent content segment such that the link associate an edge component of that content segment to an edge component of the adjacent content.

At 309, the presentation module 203 defines a presentation of the set of content segments based on the links between the content segment centers and the indicators, and the links between content segment edges and edges of their adjacent content segments. The presentation module 203 defines the presentation for each content segment from the set of content segments. The presentation module 203 can store the presentation in data store 207 and at 311 the graphical view management platform 200 can send a signal via an output signal 211 to associate the presentation to the content. For example, the signal can be sent to a user device 101 to cause display of the presentation on UI 107. In some instances, the signal can cause the storing of the presentation on a memory associated with the user device 101.

FIG. 5 shows a flowchart 320 for presenting a graphical view, according to an embodiment. At 321, the graphical view management platform 200 receives, via one or more input signals 209 an input signal (e.g., from a user device 101) associated with a content having a set of content segments being encoded based on a set of indicators, as discussed with respect to FIG. 7. The input signal may include an action indicator associated with an action to be applied on the content. An action, for example, can include at least one of a forward transition, a backward transition, selecting a content segment from the set of content segments, inserting a content segment into the set of content segments, removing a content segment from the set of content segments, modifying a content segment from the set of content segments, opening the presentation, and closing the presentation. The action can also include a transition from a plurality of content segments to a single content segment (e.g., closing a book) or a transition from a single content segment to a plurality of content segments (e.g., opening a book). The input signal can also include a presentation indicator associated with a presentation of the content provided by the presentation module 203.

In some instances, the spine control module 201 can use the presentation indicator to locate the presentation in data store 207. In other instances, the spine control module 201 may locate the presentation in a storage associated with a user device 101, on a memory associated with an application provider device 109, or a combination thereof.

At 323, the spine control module 201 sends a signal to the data store/memory including data associated with the presentation, such that the action is performed on the presentation. The spine control module 201 can use the action to select a content segment from the set of content segments of the content (for example, select a page of a book to be viewed as the current page) based on a plurality of links between content segments from the set of content segments, as described with regards to FIG. 7.

At 325, the spine control module 201 updates the content segment and the plurality of links based on the action. For example, if the action is selecting a content segment P1 as the current content segment, the spine control module 201 can move the indicators linked to the center components of the content segments (as described with regards to FIG. 7) such that the presentation module 203 presents the content segment P1 in the center of the presentation. The spine control module 201 can adjust the content segments such that the visibility of content segments adjacent to the current content segment is adjusted accordingly.

At 327, the presentation module 203 updates the presentation based on the updated content segments and the updated plurality of links by the spine control module 201. The presentation module 203 can also store the presentation in data store 207 and at 329 the graphical view management platform 200 can send a signal via an output signal 211 to associate the updated presentation to the content. For example, the signal can be sent to a user device 101 to cause display of the updated presentation on UI 107.

FIG. 9 shows a flowchart 340 for modifying a graphical view, according to an embodiment. At 341, the graphical view management platform 200 receives, via one or more input signals 209 an input signal (e.g., from a user device 101) associated with a presentation of a content having a set of content segments provided by the presentation module 203. The presentation can include the set of content segments encoded based on a set of indicators, as discussed with respect to FIG. 7. The input signal can include an action indicator associated with an action to be applied on the presentation. An action, for example, can be insetting one or more content segments, removing one or more content segments, modifying one or more content segments, browsing the content, etc.

In some instances, the content modification module 205 can use a presentation indicator to locate the presentation in data store 207. In other instances, the content modification module 205 may locate the presentation in a storage associated with a user device 101, on a memory associated with an application provider device 109, or a combination thereof.

At 343, the content modification module 205 sends a signal to the data store/memory including data associated with the content, such that the action is performed on the data to produce modified data. For example, if the action is removal of a content segment P2 from the content, the content modification module 205 can remove the link between the content segment P2 and an indicator from the set of indicators (link defined in step 305 of FIG. 7 when the presentation was defined). The content modification module 205 can then remove any links between the content segment P2 and its adjacent content segments (link defined in step 307 of FIG. 7 when the presentation was defined).

At 345, the presentation module 203 updates the presentation based on the modified data to produce an updated presentation and an updated set of indicators. For example, the presentation module 203 can store the removed content segment P2 in a predefined store location in data store 207 for further reference. The presentation module 203 can also define new links between the adjacent content segments of the removed content segment P2 such that a new sequence of content segments is defined. The presentation module 203 can store the updated presentation in data store 207 and at 347 the graphical view management platform 200 can send a signal, via an output signal 211, including the updated presentation of the content and the updated set of indicators. For example, the signal can be sent to a user device 101 to cause display of the updated presentation on UI 107. In some instances, the signal can cause a presentation on memory associated with the user device 101 removed and the updated presentation stored on a memory associated with the user device 101 (e.g., replacing an old copy of the presentation with the updated presentation). The removal of a presentation and storing of a new presentation can be performed, by the graphical view management platform 200, synchronously or asynchronously.

It is intended that the methods and apparatus described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A computing device, comprising:
   at least one processor; and
   at least one data storage device including computer-readable instructions stored thereon, the computer-readable instructions configured to instruct the at least one processor to:
      display content on an electronic display as a virtual accordion-folded sheet including a first page, a second page, and a third page with each of the first page, the second page, and the third page including a crease therethrough;
      define a virtual spine behind the virtual accordion-folded sheet, the virtual spine including:
         a front point that is at least as close to a user viewing the accordion-folded sheet as any other point of the virtual spine from a viewing perspective of the user; and
         a pair of branches extending generally backward from the viewing perspective, and generally outwards away from each other as the pair of branches extends generally backward; and
      display the virtual accordion-folded sheet as having the crease of each of the first page, the second page, and the third page coupled to the virtual spine.

2. The computing device of claim 1, wherein the virtual spine comprises a v-shaped virtual spine.

3. The computing device of claim 1, wherein the virtual spine comprises a curved virtual spine.

4. The computing device of claim 1, wherein the content comprises at least one of images, pages of a document, or a set of video frames.

5. The computing device of claim 1, wherein the content comprises at least one of a images of a photo album, pages of a book, or pages of a magazine.

6. The computing device of claim 1, wherein the computer-readable instructions are configured to instruct the one or more processors to display a fixed number of pages of the virtual accordion-folded sheet at a time.

7. The computing device of claim 1, wherein the computer-readable instructions are configured to enable a user to navigate pages of the virtual accordion-folded sheet using touch gestures on a touchscreen.

8. The computing device of claim 7, wherein the touch gestures include at least one of pinch gestures, spread gestures, tap gestures, pan gestures, drag gestures, or drop gestures.

9. The computing device of claim 1, wherein the computer-readable instructions are configured to display pages of the virtual accordion-folded sheet with uniform spacing.

10. The computing device of claim 1, wherein the computer-readable instructions are configured to display pages of the virtual accordion-folded sheet with non-uniform spacing.

11. The computing device of claim 1, wherein the computer-readable instructions are configured to display a current page of the virtual accordion-folded sheet to appear less folded than adjacent pages of the virtual accordion-folded sheet.

\* \* \* \* \*